United States Patent [19]
Siegrist et al.

[11] Patent Number: 6,102,621
[45] Date of Patent: Aug. 15, 2000

[54] OXIDATIVE PARTICLE MIXTURES FOR GROUNDWATER TREATMENT

[75] Inventors: Robert L. Siegrist, Boulder, Colo.; Lawrence C. Murdoch, Clemson, S.C.

[73] Assignee: Lockheed Martin Energy Research Corporation, Oak Ridge, Tenn.

[21] Appl. No.: 09/071,659

[22] Filed: May 1, 1998

[51] Int. Cl.$^7$ ....................................................... B09B 1/00
[52] U.S. Cl. ............................ 405/128; 405/263; 588/249
[58] Field of Search .................... 405/128, 129, 405/263, 266; 588/249, 252, 259; 106/287.35, 611

[56] References Cited

U.S. PATENT DOCUMENTS

| | | |
|---|---|---|
| 3,708,206 | 1/1973 | Hard et al. . |
| 3,956,900 | 5/1976 | Klinkner et al. ......................... 405/263 |
| 4,043,830 | 8/1977 | Suzuki ................................. 405/263 X |
| 4,844,807 | 7/1989 | Manchak ............................. 405/128 X |
| 5,221,159 | 6/1993 | Billings et al. . |
| 5,266,213 | 11/1993 | Gillham . |
| 5,430,235 | 7/1995 | Hooykaas et al. ...................... 588/252 |
| 5,447,639 | 9/1995 | Sivavec . |
| 5,502,268 | 3/1996 | Cote et al. .............................. 588/259 |
| 5,616,253 | 4/1997 | Fernando et al. . |
| 5,641,020 | 6/1997 | Cherry et al. . |
| 5,690,173 | 11/1997 | Abdul et al. . |
| 5,733,067 | 3/1998 | Hunt et al. . |

*Primary Examiner*—Dennis L. Taylor
*Attorney, Agent, or Firm*—Nexsen Pruet Jacobs & Pollard, LLP

[57] ABSTRACT

The invention is a method and a composition of a mixture for degradation and immobilization of contaminants in soil and groundwater. The oxidative particle mixture and method includes providing a material having a minimal volume of free water, mixing at least one inorganic oxidative chemical in a granular form with a carrier fluid containing a fine grained inorganic hydrophilic compound and injecting the resulting mixture into the subsurface. The granular form of the inorganic oxidative chemical dissolves within the areas of injection, and the oxidative ions move by diffusion and/or advection, therefore extending the treatment zone over a wider area than the injection area. The organic contaminants in the soil and groundwater are degraded by the oxidative ions, which form solid byproducts that can sorb significant amounts of inorganic contaminants, metals, and radionuclides for in situ treatment and immobilization of contaminants. The method and composition of the oxidative particle mixture for long-term treatment and immobilization of contaminants in soil and groundwater provides for a reduction in toxicity of contaminants in a subsurface area of contamination without the need for continued injection of treatment material, or for movement of the contaminants, or without the need for continuous pumping of groundwater through the treatment zone, or removal of groundwater from the subsurface area of contamination.

22 Claims, 4 Drawing Sheets

OXIDATIVE PARTICLE MIXTURES FOR GROUNDWATER TREATMENT

STATEMENT AS TO RIGHTS TO INVENTIONS MADE UNDER FEDERALLY-SPONSORED RESEARCH AND DEVELOPMENT

The United States Government has certain rights in this invention pursuant to contracts numbers DE-AC05-960R22464 and DEAC05-840R21400, between the U.S. Department of Energy and Lockheed Martin Energy Research Corporation.

BRIEF SUMMARY OF THE INVENTION

The invention relates generally to technology for treatment and immobilization of contaminates in soil and groundwater with reactive mixtures, and more particularly to a composition and a method for in situ and ex situ treatment and immobilization of contaminants in soil and groundwater by granular inorganic oxidative chemicals suspended within a carrier fluid.

BACKGROUND OF THE INVENTION

Injection of chemicals for in situ treatment of groundwater is commonly utilized to remediate regions of contamination below ground. Prior techniques for groundwater treatment of organic chemicals including chlorinated solvents and petroleum products include above-ground treatment or in situ injection of treatment materials. Typical treatment materials include neutralizing agents, steam, oxygenated solutions, biologically active materials, reducing metals, and/or mixtures of adsorbing materials along with any of the preceding treatment materials. Limitations of the use of the preceding treatment materials are many, including poor treatment efficiency, an inability to treat organic mixtures, metals and radioactive waste, high costs of materials and continuing injection of materials, production of toxic by-products, limits as to the depth of injection of materials, the dissolution of materials during injection, and the lack of dispersion of materials in situ. There is great interest in development of an injectable treatment material which will reach in situ strata of contamination without dissolution, will disperse throughout the zone of contaminated soil and groundwater, will continuously react with organic contaminants without producing toxic by-products in situ, and will bind and immobilize metals and radioactive contaminants in situ to limit the spread of toxic or radioactive contaminants in groundwater.

In Abdul et al., U.S. Pat. No. 5,690,173, incorporated herein by reference, an apparatus for enhanced bioremediation of underground contaminants is disclosed which is used within an injection well to enhance the biological treatment of water-borne soil contaminants in situ with microbes by achieving optimal levels of oxidizing agents within the soil.

In Hunt et al., U.S. Pat. No. 5,733,067, incorporated herein by reference, a treatment system is disclosed using chemically or biologically reactive sheets placed within the soil.

In Cherry et al., U.S. Pat. No. 5,641,020, incorporated herein by reference, a treatment system is disclosed for injecting hydrofracture fluid and reactive treatment material into subsurface fractures containing, or near to, contaminated groundwater, with the reactive treatment material causing contaminants to diffuse out of the soil matrix toward the fractures containing injected reactive materials, with chemical breakdown of contaminants when the contaminants come in contact with the injected reactive materials.

In Fernando et al., U.S. Pat. Nos. 5,616,253, and 5,611,936, both of which are incorporated herein by reference, various methods are disclosed for utilizing a palladized iron bimetallic system for the dechlorination of chlorinated organic compounds in contaminated soils and various effluents.

In Sivavec, U.S. Pat. No. 5,447,639, incorporated herein by reference a method is disclosed for remediation of aqueous solutions of chlorinated aliphatic hydrocarbons utilizing in situ or ex situ reactions with ferrous sulfide.

In Gillham, U.S. Pat. No. 5,266,213, incorporated herein by reference, a method is disclosed for remediation of aqueous halogenated organic compounds utilizing iron metal placed in a trench or well to produce reducing conditions.

In Billings et al., U.S. Pat. No. 5,221,159, incorporated herein by reference, a method and apparatus are disclosed for removing contaminants from soil utilizing injection wells, oxygenated gas injection, and a vacuum applied at an extraction well.

In Hard et al., U.S. Pat. No. 3,708,206, incorporated herein by reference, a process is disclosed for leaching base elements from ore deposits such as uranium from an underground water containing oxidizable materials such as sulfides and carbon utilizing oxygen bearing gas.

The above described methods utilize one or more degradative components that are injected into contaminated groundwater for remediation of contaminants or containment of contaminants. Conventional methods require pumping of large volumes of groundwater for treatment of contaminants above ground, or require injection of components that have poor treatment efficiency and require long treatment periods. Conventional groundwater treatment techniques have the drawbacks of high costs, produce toxic by-products, are limited as to the type and concentration of contaminants treated, the depth of injection of components, and/or have components that dissipate and dilute after injection, or do not disperse in situ unless pumping is continued. Continuous pumping of groundwater, or injection of short-lived components into groundwater is costly and inefficient. Thus there exists room for improvement within the art.

SUMMARY OF THE INVENTION

It is an object of this invention to provide a composition and a method directed towards the treatment of soil and groundwater.

It is a further object of this invention to provide a composition and a method that provides for oxidative in situ treatment of organic and inorganic chemicals found in contaminated soil and groundwater.

It is yet a further object of this invention to provide a composition and method that provides for ex situ treatment of contaminated soil and/or groundwater.

It is an additional object of this invention to provide a composition and a method that provides for in situ immobilization of metals, radioactive materials, and by-products from oxidative treatment of contaminated soil and groundwater.

It is a further and more particular object of this invention to provide a composition and a method that delivers a mixture of granular reactive chemicals suspended within a carrier fluid to an in situ area of contaminated soil and groundwater without significant dissolution of the reactive granules before injection into the subsurface.

It is yet a further and more particular object of this invention to provide a composition and a method of in situ treatment which is efficient and low cost in application toward degrading and immobilizing contaminants in soil and groundwater.

It is yet an additional and more particular object of this invention to provide a composition and a method of in situ treatment which may create in situ treatment barriers around the contaminants within soil and groundwater and which further prevent migration of contaminants.

These and other objects of the invention are accomplished by a composition and a method of long-term treatment and immobilization of contaminants in soil and groundwater including: providing a mixture having a minimal volume of free water, mixing at least one inorganic oxidative chemical in granular form into a carrier fluid comprising a fine-grained inorganic hydrophilic material such as clay or cement, and water. The resulting oxidative particle mixture (OPM) is injected into the subsurface areas of contamination where the granular form of the oxidative chemical dissolves and moves by diffusion and/or advection toward the contaminants, with the oxidative chemical ions reacting with the organic contaminants, and/or forming solid oxidation byproducts that sorb metal and radionuclide contaminants, therefore providing in situ destruction of organic contaminants such as chlorinated organics and petrochemicals along with the immobilization of metal and radionuclide contaminants in soil and groundwater.

Thus, the objects of the invention are accomplished by the composition and method for long-term treatment and immobilization of the contaminants in soil and groundwater in the subsurface as described herein.

BRIEF DESCRIPTION OF THE DRAWINGS

The inventions features and advantages will become apparent from a reading of the following detailed description, given with reference to the figure of drawing, in which.

DETAILED DESCRIPTION OF THE PREFERRED EMBODIMENTS

Figure 1A:
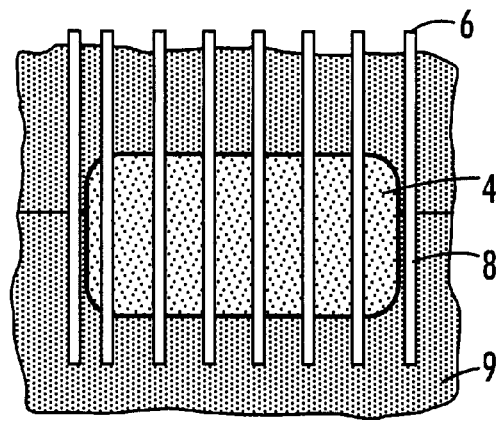
FIGS. 1A–1C are cross-section views of injection methods extending down into a subsurface area in which the oxidative particle mixture of the present invention is injected to permeate, fracture, or fill a zone for treatment and immobilization of contaminated soil and groundwater.

In accordance with this invention, it has been found that a method of making and use of a composition of a semi-solid mixture is needed that provides for treatment, detoxification, and/or immobilization of organic and inorganic contaminants within soil and groundwater in the subsurface. Soil and groundwater may be contaminated with organic chemicals including chlorinated solvents (e.g. trichloroethylene (TCE) and tetrachloroethylene (PCE), and petroleum products (e.g. benzene, toluene, and xylene), with inorganic contaminants such as toxic metals including lead, chromium, and cadmium, and/or with radioactive compounds including uranium, thorium, and technetium.

As used herein, the term "soil" includes sediments, rock, and both shallow and deep soil layers as well as excavated soil being treated ex situ.

The invention described herein is capable of in situ treatment of contaminants within soil and groundwater, and in situ immobilization of metals and radioactive compounds. The invention utilizes at least one reactive chemical compound comprising particles of an oxidative chemical suspended within a carrier fluid. The oxidative inorganic chemical(s) remains in a granular form until emplaced by injection through an injection well 1 into subsurface soils such as silt, clay, sand, or gravel. (see FIGS. 1A–1C). Upon emplacement into the zone of injection 3 as shown in FIG. 2, the oxidative inorganic chemical 7 gradually dissolves over time yielding oxidative ions 9, which move by diffusion and/or advection from the injection zone 3 throughout the zone of contamination 11, where the oxidative ions 9 degrade the organic contaminants in the soil and groundwater. As seen in FIG. 2, the diffuse reactive zone extends beyond the initial placement location of the mixture.

The inorganic oxidizing chemicals 7 of the OPM mixture 5 are in granular form, are suspended in a carrier fluid, and are thoroughly mixed to form a pumpable mixture that is highly reactive when exposed to organic chlorinated solvents and petroleum products. The OPM 5 and resulting reactions of the OPM are designed to:

(a) remain in suspended granular form within the carrier liquid until the mixture reaches the treatment zone;

(b) dissolve from granular form into the liquid phase in situ, establishing a concentration gradient for the molecular diffusion and/or advection of high concentrations of oxidative ions 9 from the zone of injection 3, throughout the area 11 of contaminated soil and groundwater;

(c) induce and sustain conditions that are highly oxidizing within a broad zone 11 of soil groundwater where the contaminants reside, with the continued delivery by advection or diffusion of oxidative ions 9 toward the organic contaminants for continued degradation of contaminants without the need for induced pumping of groundwater in the subsurface; and (d) provide a plurality of solid by-products (not shown) from the oxidizing ion reactions, the solid by-products having high surface area and high sorption capacity for in situ immobilization of metals and radionuclides when contact occurs between the metals and radionuclides and the solid by-products within subsurface soil.

An unexpected result of the distribution of the oxidizing ions and the formation of a plurality of solid by-products of step (d) above is that the solid by-products form amorphous particles of approximately 1 to a few microns in size, with high surface area and high sorptive properties. As discussed further below, the small amorphous particles are able to sorb significant amounts of many metals and radionuclides.

Oxidative Particle Mixture (OPM)

The inorganic oxidative chemical portion of the OPM comprises at least one granular oxidizing chemical such as potassium permanganate ($KMnO_4$), sodium permanganate ($NaMnO_4$), calcium persulfate, magnesium percarbonate, other percarbonate compounds or additional solid oxidizing compounds. The granular size of the solid particle oxidizing chemicals is approximately 5 millimeter grain size, or smaller. The small granular size of the particulate oxidative chemicals allow the particles to remain as a slurry of solids suspended in a carrier fluid. One kilogram of the granular oxidizing chemicals mixture provides sufficient oxidizing power to degrade approximately 0.2 kg of a chlorinated hydrocarbon such as TCE or PCE. The TCE, PCE, and other organic chemical contaminants are degraded and mineralized into less toxic compounds such as hydrogen, chloride, water, and carbon compounds when subjected to localized in situ highly oxidizing conditions created by oxidative ions migrating from the injection zone and through the contaminated soils and groundwater.

Figure 2:
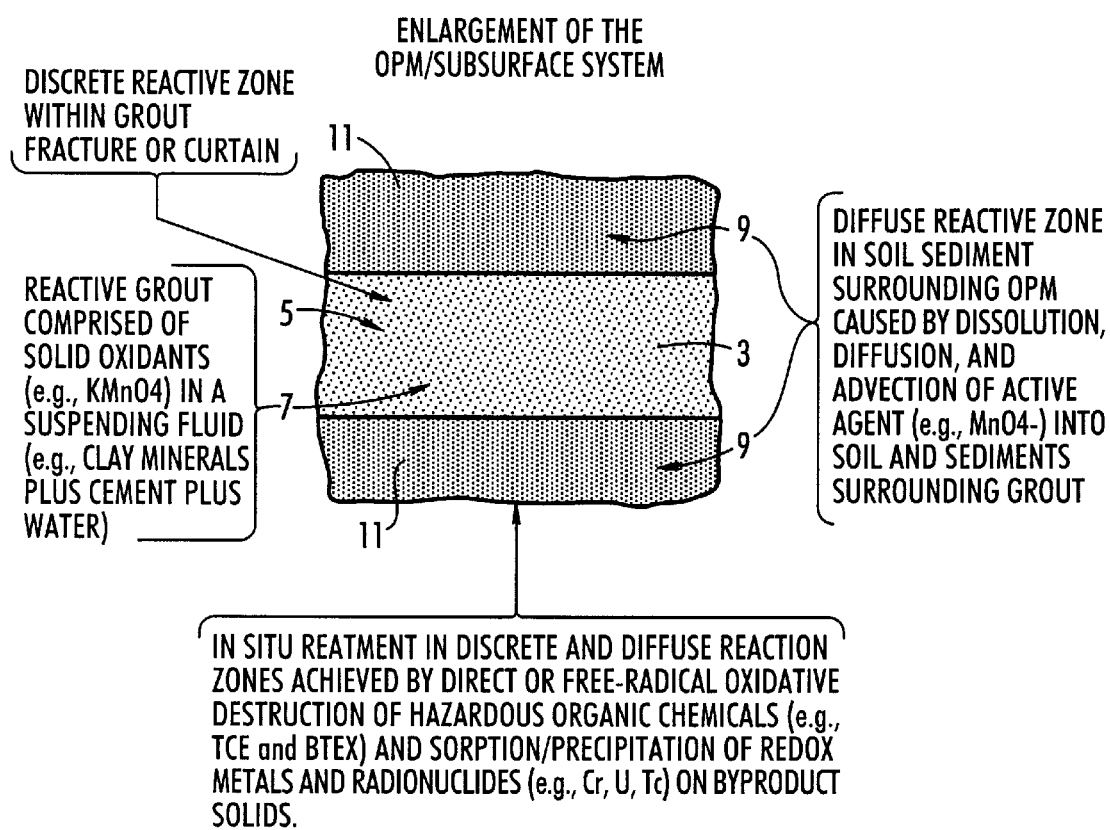
FIG. 2 is a cross-section view of the oxidative particle mixture of the present invention after injection into a treatment zone in the subsurface within an area of contaminated soil and groundwater.

As seen in relation of FIG. 1A, the OPM is pumped into one or more open borings created for that purpose and/or into a well casing within a boring. A number of vertically, slanted, or horizontally oriented borings or well casing 2 are placed in a grid pattern within a contaminated site 4 to ensure distribution of the reactants 9 throughout the region to be treated by advection and/or diffusion over time. A vertical emplacement mode is shown, the placement of OPM indicated by locations 8.

Figure 1B:
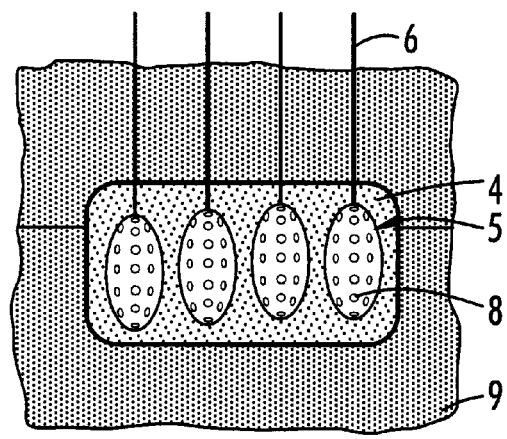

As seen in FIG. 1B, an alternative placement utilizes small hollow tubes 6 (e.g., 2 to 4 cm diam.) which are augured or pushed into the subsurface to depths of up to 50 m or more and OPM 5 is injected under pressure out of the bottom tip of the tuber or lance and permeates the pores, cracks, and fissures in the surrounding soil, sediment and rock. In addition, this mode of placement also includes the use of a high pressure jet to cut or erode soil or rock with the concurrent injection and mixing of OPM. Continued dissolution and advection and diffusion over time leads to complete treatment of the contaminated zone.

Figure 1C:
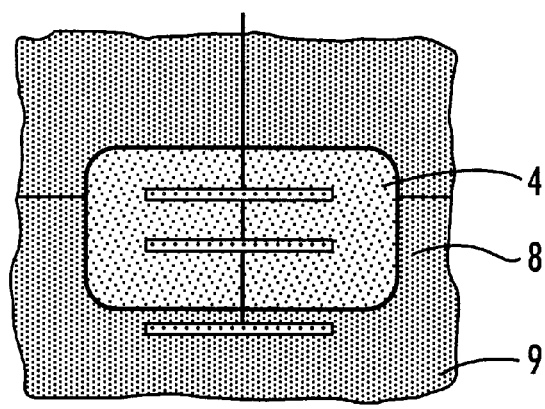

As seen in FIG. 1C, soil or rock fracturing methods can also be used to emplace a horizontal, slanted or vertical fracture or network of fractures filled with OPM 5. The treatment zone gradually expands outward from the location of initial emplacement 8 during advection and diffusion of oxidizing ions and reactive byproducts. Continued dissolution and advection and diffusion over time leads to complete treatment of the contaminated zone.

Once emplaced, the granular form dissolves slowly into oxidative ions 9, e.g. (MnO4—), that migrate away from the injection zone 3 of inorganic granular OPM by molecular diffusion and/or advection, without the need for man-made induced pumping or even the natural movement of contaminated groundwater. The diffusion or transport of the oxidative ions away from the fracture zone 3 creates a reaction zone 11 of oxidation ions that may extend 10 to 100 cm or more above, below, and along horizontal pathways away from the OPM filled injection zone.

The reaction zone may be sustained for a period of months to years by slow dissolution and diffusion or advection of reactive ions away from the injection zone of the OPM. This is especially true for treatment areas where subsurface rates of water flow are low. Oxidative reactions with the soil and groundwater contaminants may occur throughout the reaction zone as the reaction zone spreads with time. The continued reactions of oxidation ions with organic contaminants, along with the eventual size of the reaction zone, is dependent on the initial OPM composition, the viscosity of the OPM, the mass of the injected OPM, the method of emplacement, the rate of the injection, and the groundwater flow characteristics in the subsurface region of treatment. Natural or induced groundwater flow is not required for the oxidation treatment process to continue, due to the natural movement of oxidation ions by molecular diffusion from the highest concentration within the injection zone to the lower concentrations of the reaction zone.

Figure 3:
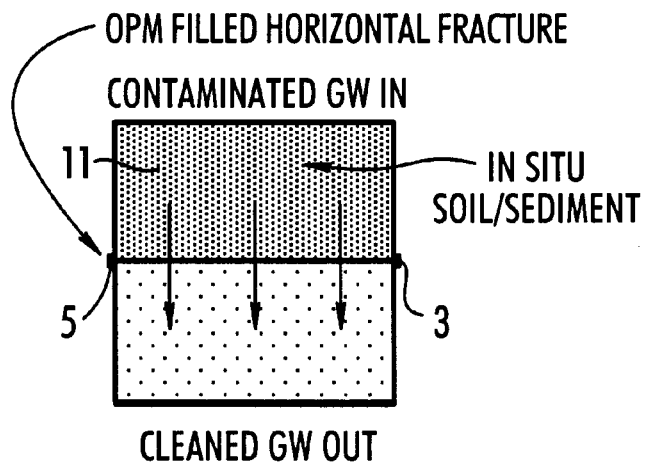
FIG. 3 is a close-up view of the treatment zone of the present invention within a horizontal subsurface fracture within an area of contaminated soil and groundwater.
Figure 4:
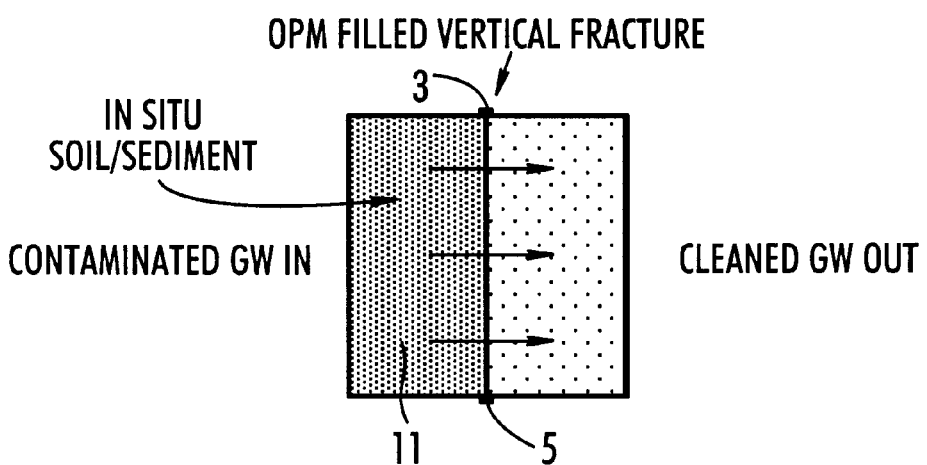
FIG. 4 is a close-up view of the treatment zone of the present invention within a vertical subsurface fracture or curtain for treatment of contaminated soil and groundwater.

As seen in FIGS. 3 and 4, a horizontal or vertical OPM-filled fracture can be provided as a treatment barrier for plumes and flowing groundwater. As contaminants move through the treatment barrier, the contaminants are treated and groundwater flow passing on the outlet side of the barrier is substantially contaminant-free.

The oxidizing reactions of the OPM ions (e.g. $MnO_4^-$) can rapidly degrade a wide range of organic chemicals. The permanganate ions oxidize the chlorinated hydrocarbon ($RCl_x$) compounds and are themselves reduced to form solid by-products such as $MnO_2$. The solid by-products may combine physically by sorption, and/or chemically with inorganic contaminants, metals, and radionuclide contaminants within the zone of treatment created in situ by permanganate ions and solid by-products.

The plurality of solid by-products resulting from the oxidation reactions of the oxidants are small amorphous particles of approximately 1 to approximately 5 microns in size, with a high ratio of surface area to volume and high sorptive properties for immobilization of some metal contaminants (e.g. lead, chromium, cadmium, and other toxic metals), and radionuclides (e.g. uranium, technetium, thorium, and other radioactive materials), that may be found mixed with chlorinated solvents or petroleum hydrocarbon contaminants within soil or groundwater at many sites requiring remediation to meet U.S. Environmental Protection Agency or state agency environmental cleanup standards. Therefore, after injection into the subsurface the oxidative chemicals of the OPM provide for a continuing release of oxidative ions that diffuse, even absent the movement of groundwater, toward the target contaminants, forming a zone of treatment with the oxidative ions intercepting, degrading, and/or immobilizing both organic and inorganic contaminants in the subsurface areas of soil and groundwater contamination.

An additional benefit of injection of the OPM, the reactions of the oxidative ions, plus the formation of a plurality of solid by-products, is the oxidation of amorphous natural organic matter that naturally coats clay minerals in the soil. This oxidizing of the natural organic matter changes the properties of soil by "opening up" or conditioning mineral surfaces to have a higher binding affinity for many metals and radionuclides within the contaminated area of soil and groundwater. Therefore, the movement by diffusion and/or advection of the oxidative ions away from the injection zone, toward and through contaminated regions, with resulting creation of highly sorptive solids and reconditioned mineral matter within the areas of contamination, provides for a potentially broad zone of treatment that is not limited to initial injection sites within fractures or within original areas of contaminated groundwater and soils.

Figure 5A:
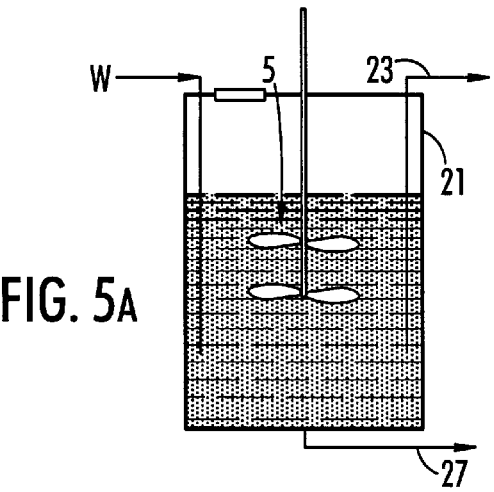
FIGS. 5A–5C are schematic views which illustrate the use of the oxidative particle mixture in an above-ground batch reactor.

As seen in FIG. 5A, ex situ treatment can be used with the present invention. Ex situ treatment comprises using a reactor 21 to which contaminated water or soil is added (arrow W). OPM 5 is added to the reactor and mixed for 30–60 minutes.

Figure 5B:
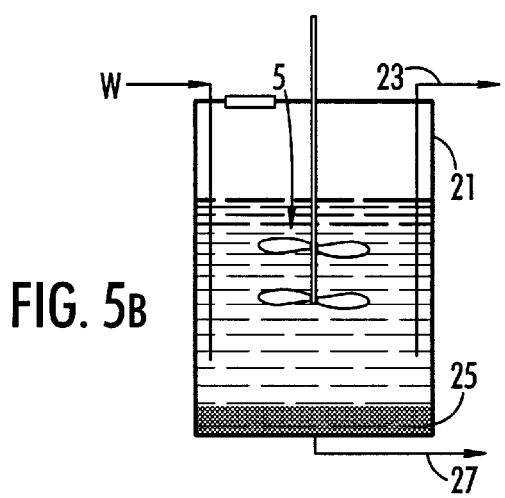

In reference to FIG. 5B, mixing is stopped and sedimentation is allowed to occur for 1–3 hours. A reducing agent (e.g., sodium thiosulfate) can be added to remove any excess oxidants. Sorption of metals and radionuclides occurs on the reactive solids formed as oxidation byproducts of the destruction of organic contaminants and during reduction of residual oxidant. Sedimentation of the solids occurs along with the sorbed metals/radionuclides.

Figure 5C:
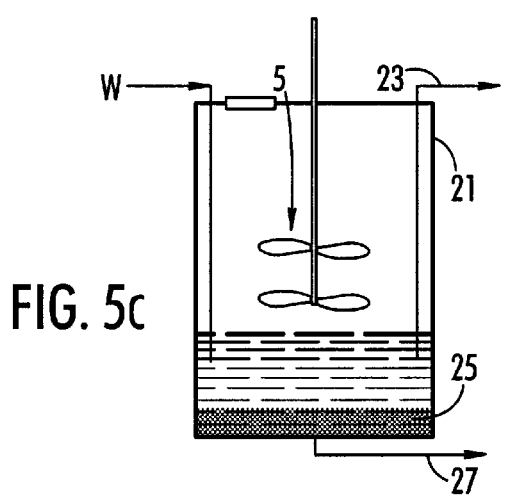

As seen in FIG. 5C, the clean supernatant is decanted off via outlet 23 and the reactor is refilled for additional treatment. Periodically, accumulated solids 25 are moved via line 27 for recycling or disposal.

The disclosure and example given in reference to subsurface treatments are equally applicable to ex situ treatment. A reactor or above ground volume of excavated soil can be treated with similar techniques. In such instances, the use of "subsurface" is analogous to "below surface" when in reference to treatment protocols. Likewise, "groundwater" is applicable to the water content associated with an ex situ treatment pile or reactor.

Carrier Fluid

The OPM 5 contains the following components which form an inorganic matrix that is pumpable and highly reactive. The inorganic oxidizing chemicals 7 are present as granular solids in approximately 50% by weight of the total mixture, with $KMnO_4$, $NaMnO_4$, or other solid oxidant compounds comprising approximately 50% by weight of the total mixture. The granular solids content may be varied between approximately 20% to 90% by weight, depending on the type of treatment application in the subsurface area of contaminated soil and groundwater.

The carrier fluid comprises a mixture of hydrated clay minerals such as montmorillonite, kaolinte, illite/smectite or additional compounds, with the clay components present in approximately 2.5% or more of the total slurry mass. The carrier fluid also may include cement compounds, such as Portland cement, that provides a pH buffering agent for the carrier fluid. The cement component may be approximately 2.5% of the total volume. The cement and/or hydrated clay materials interact with free water to increase the sheer strength of the carrier fluid. The increased shear strength and viscosity are required for the carrier fluid to suspend granules of OPM during pumping. The oxidative particles are well mixed with the carrier fluid that may be approximately 45% of the total volume. The free water portion of the carrier fluid is preferably less than approximately 3% by weight, with minimal separation of the granular oxidation chemicals from the carrier fluid during injection. The rheological properties of the carrier fluid holds the fluids, inorganic materials, and oxidative granules in a slurry form, providing a pumpable material that reduces separation and loss of fluids during the steps of mixing and injection of the OPM. The OPM is designed to have adequate strength and consistency as provided by the clay and hydrated materials, to be emplaced by pumping and injecting into the subsurface by conventional subsurface access and injection techniques such as coring, trenching, injection, hydraulic fracturing, and jet grouting, mechanical soil mixing, and pumping through established well casings and as seen in reference to FIGS. 1A–1C.

The hydrophilic material (e.g. clay or cement) is added to the water to increase the viscosity and shear strength. This change in properties occurs as the water forms hydration shells around the grains of hydrophilic material. The interaction of hydrated inorganic grains in water changes the rheology by increasing the viscosity and shear strength. This change enables solid granules of OPM to be suspended in the carrier fluid during pumping and injection. Using a carrier fluid that is thixotropic or thins with shear, is an objective since this makes the fluid easier to inject compared to Newtonian fluids of similar viscosity. These Theological properties must be maintained while the fluid is exposed to the reactive chemicals transported by the mixture. The rheology of some carrier fluids, such as organic polymer gels will be degraded (the viscosity and shear strength will be reduced) when the carrier fluid is exposed to the oxidative material. The rheology of the carrier fluid formed from inorganic hydrophilic material, such as clay or cement, is suitable for suspending and pumping oxidative particles and it will maintain that rheology in the presence of highly oxidizing conditions. The Theological properties of the embodiments disclosed herein have been found useful in maintaining the rheology integrity of the carrier fluid.

Silicate grouts or cements and/or calcium grout or cement mixtures may be a replacement for the cement portion and/or the clay portion of the carrier fluid mixture. Other reactive particles may be utilized, such as reducing agents consisting of zero-valent metals such as iron filings or iron particles. Also, absorbing or adsorbing components such as activated carbon, organic peat, chitin, zeolites, or other sorbents may be added to the carrier fluid mixture to increase the inherent ability of the mixture to immobilize both organic chemicals, inorganic metals, and radionuclides.

In situations of high groundwater flow rate, it may be useful to encapsulate the oxidation agent, such as $KM_NO_4$, with a coating which slows down the dissolution rate of the oxidative agent. Coating of an organic polyvinylidene chloride copolymer (Saron™) or a polyvinylidene sulfone could be used to control the dissolution rate. Inorganic coatings of cement would also suffice by forming a shell around the $KM_NO_4$ granules. Such coating would also make the material safer for worker handling.

Similar retardation of dissolution is believed possible by providing a high clay component to the carrier fluid. The clay particles would tend to slow down water movement and hence decrease the dissolution rate of the oxidative chemicals.

Injection of the OPM

The inorganic oxidative chemical 7 portion of the OPM 5 remains in solid, granular form until emplaced into the subsurface by conventional methods such as hydraulic fracturing within the area 11 of contaminated soil and groundwater. (See FIG. 2) One method of emplacement of the OPM is by hydraulic fracturing utilizing wells 1 extending into the subsurface utilizing pumping pressures ranging from initial injection pressures to initiate subsurface fracturing of contaminated strata, to injection pressures as low as 1 PSI for the continued injection of the OPM to fill fractures initiated by the initial injection of fluids. Once emplaced, the OPM may form horizontal and/or vertical zones near the targeted contaminants, depending on the hydraulic fracturing techniques utilized and the use of multiple injection pathways. The horizontal and/or vertical injection zones 3 may be placed in either the unsaturated or saturated zones of the subsurface, and may treat contaminated zones or form barriers to limit the movement of soil and groundwater contaminants from an area 11 of existing contamination.

Hydraulic fractures can be created from vertical, inclined, curved or horizontal borings. The fractures can be created using conventional injection methods, or they can be formed using high pressure pulses of fluid (not shown). The high pressure pulses of fluid can be directed toward the wall of a boring, trench or other structure cut into the subsurface. The high pressure pulse can be directed vertically downward from the ground surface to treat contaminated materials that are within several meters of the ground surface. The pulses can be used to create fractures filled with OPM, or they can be used to create cylindrical cavities filled with OPM. Large areas where contaminated material is within several meters of the ground surface may be treated by creating a plurality of fractures or cavities filled with OPM using high pressure pulses.

The hydraulic injection techniques for emplacement of the OPM may include alternate treatment areas such as emplacement of treatment walls (not shown) of OPM in combination with other commonly utilized treatment agents such as activated carbon, ion exchange resins, and/or iron particles. Techniques commonly known in the groundwater remediation industry will allow emplacement of treatment walls containing OPM, with the walls located within the pathway of contaminated groundwater movement. The OPM provides an improvement in treatment barriers by providing semi-solid mixtures of granular oxidation chemicals that form controlled release of treatment and immobilization materials within horizontal or vertical barriers in the subsurface. The barriers formed by the OPM may be installed in the subsurface as shallow as just under the ground-surface, or injected to depths needed to reach both the unsaturated and saturated zone.

OPM can also be injected into the subsurface using a high pressure jet (pressure greater than 800 psi) that will cut, erode or disrupt subsurface material. The OPM is injected either through the nozzle supplying the high pressure jet, or as a low pressure stream in the vicinity of the jet. While a preferred embodiment of the invention sues a carrier fluid with clay, high pressure pulse methods of injection using water or some other fluid could introduce the oxidative chemicals at the nozzle using gravity feel or air stream in conjunction with an eductor. In effect, a highly turbulent mixture of water or air can suspend the particles during the injection process.

Although the present invention is described in considerable detail with reference to certain embodiments of the OPM and carrier fluid components, other mixtures of inorganic and organic chemicals in combination with the granular oxidative chemical and carrier fluids are possible.

Many variations will undoubtedly become apparent to one skilled in the art upon a reading of the above specification with reference to the figures. As the foregoing description is exemplary in nature, the spirit and scope of the appended claims should not be limited to the description of the preferred versions of the invention contained herein.

What is claimed is:

1. A method for the treatment of contaminants within soil and groundwater comprising the steps of:
   providing at least one inorganic oxidative chemical in a granular form;
   adding a carrier fluid to said oxidative chemical, said carrier fluid further comprising a fine grained inorganic hydrophilic material;
   mixing said oxidative chemical with said carrier fluid, thereby providing a mixture;
   injecting said mixture into an injection zone in the subsurface area;
   dissolving said granular form of said at least one inorganic oxidative chemical in the subsurface area;
   generating a plurality of oxidative ions from said dissolving step;
   dispersing passively said plurality of oxidative ions;
   reacting said contaminants with said plurality of oxidative ions.

2. The method as described by claim 1, wherein said hydrophilic material further comprises at least one material selected from the group consisting of Portland cement, bentonite clay, kaolinte, clay minerals, silicate, cement, and calcium cement compounds.

3. The method as described by claim 1, wherein said at least one inorganic oxidative chemical in granular form is selected from the group consisting of $KMnO_4$, $NaMnO_4$, calcium persulfate, magnesium percarbonate, permanganate compounds, and percarbonate compounds.

4. The method as described by claim 1, wherein said granular form of said inorganic oxidative chemical further comprises a grain size of less than about 5 millimeters.

5. The method as described by claim 1, wherein the step of providing said mixture further comprises a mixture having no more than approximately 3% free water by weight.

6. The method as described by claim 1, wherein the step of injecting further comprises emplacement of said mixture into the subsurface by a method selected from the group consisting essentially of coring, trenching, pressurized injection, hydraulic fracturing, and jet grouting, mechanical soil mixing, and pumping of said mixture.

7. The method as described by claim 1, wherein the step of dispersing passively further comprises diffusion and advection.

8. The method as described by claim 1, wherein the step of reacting further comprises degrading organic components of said contaminants into mineralized compounds within the subsurface.

9. The method as described by claim 1, wherein the step of reacting further comprises forming a plurality of amorphous particles of about 1 to about 5 microns in size, said plurality of amorphous particles contained within the subsurface.

10. The method as described by claim 1, wherein the step of reacting further comprises sorption of contaminants on a surface of solid by-products generated within the subsurface.

11. A method for treatment and immobilization of contaminants within soil and water comprising the steps of:
    providing at least one inorganic oxidative chemical having a granular form;
    adding a carrier fluid to said oxidative chemical, said carrier fluid further comprising a fine-grained inorganic hydrophilic material;
    mixing said oxidative chemical with said carrier fluid, thereby providing a thixotropic mixture;
    injecting said mixture into the subsurface;
    dissolving said at least one inorganic oxidative chemical into said soil and water;
    generating a plurality of oxidative ions from said oxidative chemical;
    passively moving said plurality of oxidative ions toward said contaminants without the movement of water;
    reacting organic members of said contaminants with said plurality of oxidative ions; and
    forming a plurality of solid reaction by-products from said reacting step, said plurality of solid by-products remaining within said soil and groundwater.

12. The method as described by claim 11, comprising the additional step of reacting said solid by-products with metal and radionuclide members of said contaminants.

13. The method as described by claim 11, wherein the step of passively moving said plurality of oxidative ions further comprises moving said oxidative ions by diffusion and advection to and through said contaminants in soil and groundwater.

14. The method as described by claim 11, wherein said hydrophilic material further comprises at least one material selected from the group consisting of Portland cement, bentonite clay, kaolinte, clay minerals, silicate cement compounds, and calcium cement compounds.

15. The method as described by claim 11, wherein said at least one inorganic oxidative chemical in granular form is selected from the group consisting of KMnO4, NaMnO4, calcium persulfate, magnesium percarbonate, and permanganate compounds.

16. The method as described by claim 11, wherein said granular form of said inorganic oxidative chemical has a grain size of less than about 5 millimeters.

17. The method as described by claim 11, wherein the step of providing said thixotropic mixture further a mixture having no more than approximately 3% free water by weight.

18. The method as described by claim 11, wherein the step of injecting further comprises emplacement of said mixture into the subsurface by a method selected from the group consisting essentially of coring, trenching, pressurized injection, hydraulic fracturing, and jet grouting, mechanical soil mixing, and pumping of said mixture.

19. The method as described by claim 11, wherein the step of passively moving said oxidative ions further comprises diffusion and capillary advection.

20. The method as described by claim 11, wherein the step of reacting further comprises degrading organic components of said contaminants into mineralized compounds within the subsurface.

21. The method as described by claim 11, wherein the step of forming a plurality of solid by-products further comprises forming a plurality of amorphous particles of about 1 to about 5 microns in size, said plurality of amorphous particles retained within the subsurface region.

22. A method of treating excavated soil and groundwater comprising:

provided at least one inorganic oxidative chemical having a granular form;

adding a carrier fluid to said oxidative chemical, said carrier fluid further comprising a fine-grained inorganic hydrophilic material;

mixing said oxidative chemical with said carrier fluid, thereby providing a thixotropic mixture;

injecting said mixture into the excavated soil;

dissolving said at least one inorganic oxidative chemical into said soil and water;

generating a plurality of oxidative ions from said oxidative chemical;

reacting organic members of said contaminants with said plurality of oxidative ions; and forming a plurality of solid reaction by-products from said reacting step, said plurality of solid by-products remaining within said soil and groundwater.

\* \* \* \* \*